Aug. 7, 1951          E. E. OSTROW          2,563,413
ELECTROMECHANICAL DEVICE
Filed June 12, 1945
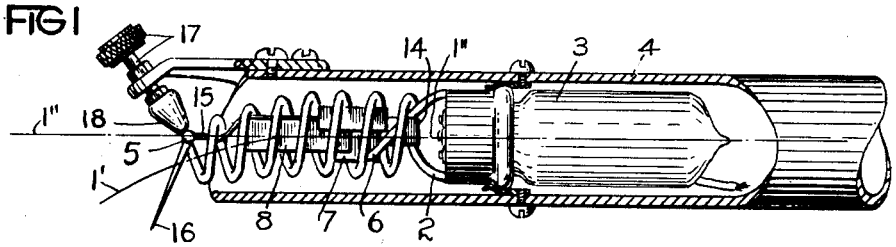
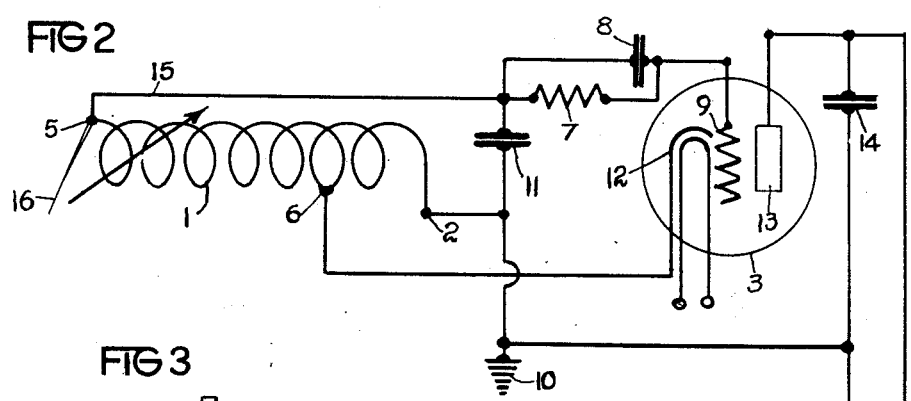
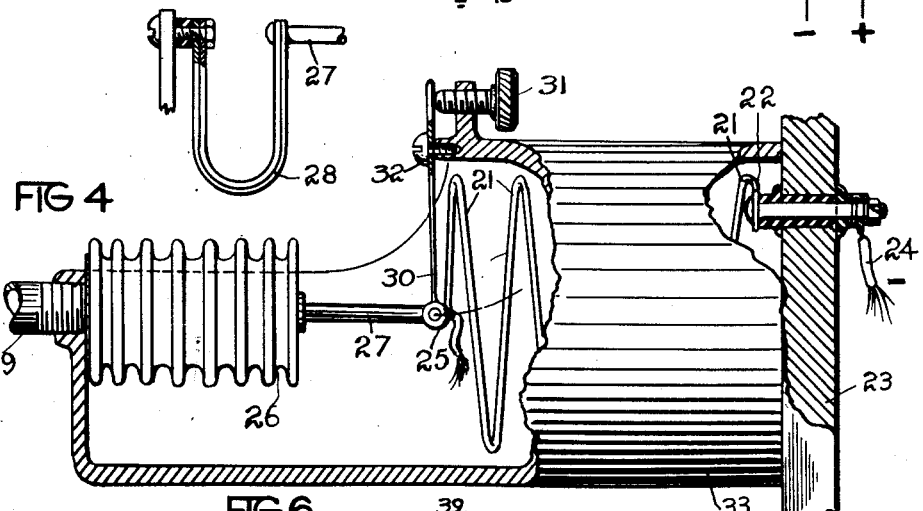
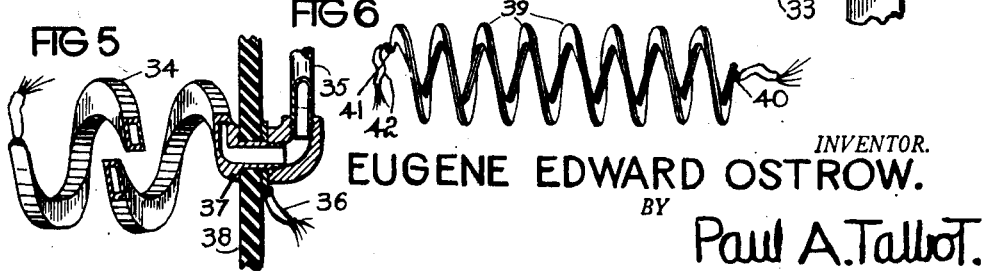
INVENTOR.
EUGENE EDWARD OSTROW.
BY
Paul A. Talbot.
ATTORNEY.

Patented Aug. 7, 1951

2,563,413

UNITED STATES PATENT OFFICE 2,563,413

ELECTROMECHANICAL DEVICE

Eugene Edward Ostrow, New York, N. Y.

Application June 12, 1945, Serial No. 598,994

6 Claims. (Cl. 171—242)

My invention relates to a coil and means for tuning or altering the frequency of the coil by changing the shape of the coil and particularly by effecting a physical change of the coil by deformation, movement of either or both of its ends or movements of the coil elements with respect to the coil axis.

Among the purposes and objects of my invention are to provide a means for changing the shape of an electrical coil to vary the inductance or effective inductance of the coil.

Another object is to provide a coil of resilient material and means for mechanically moving one or both of its ends.

Another object is to provide a variable or asymmetrical shape tuning coil.

Another object is to provide a tuning coil of flexible or semi-rigid construction and means for statically or dynamically altering the size, shape, or contour, or position of the coil to effect the subsequent altering of the oscillating frequency of the circuit of which the coil forms a part.

Another object is to provide a motions indicator (telemetering) affected by changing the shape of the coil by the motion to be indicated.

Another object is to provide a vibration explorer (amplitude, phase, and frequency); dynamic balance indicator having a coil tuned by its deformation.

Another object is to provide a frequency modulation oscillator affected by deformation of a coil in the circuit, the variable reactance of the deformed coil.

Another object is to provide a phono pickup, frequency modulations microphone or limit tripper mechanism having a coil tuned by deformation.

Indicators for temperature, pressure, altitude, humidity, governor controllers, regulators, resonance indicators, air, gas, and liquid velocity indicators, strain gauges, tuners (manual or remote) radio receivers or transmitters by variable reactance, or a combination of deformable coils in balancing bridge circuits, and other similar uses having actuating means to deform a tuning coil.

Another object is to provide a means of affecting detonators for warhead, shells, rockets, mines, land lines, and other explosive devices in which a deformable coil is actuated.

Another object is to provide a sensitive means of controlling or tuning electric circuits.

Another object is to provide a coil tuned with few or no additional moving parts.

Another object is to provide a direct pickup to oscillator connection (phono pick up).

Another object is to provide a simple construction.

Another object is to provide a small size pick up unit permitting small fixed condensors.

Another object is to provide a tuning device having a minimum of electrical or mechanical losses, which is relatively frictionless and resistanceless.

Another object is to provide a control without time lag in control devices.

Among the purposes and objects of my invention are to provide a coil of such form from the standpoint of shape and the motion or motions applied or impinged upon the flexible portion or portions of the coil as to limit such deformation beyond the point of a true geometric or symmetrical concept. The coil may be asymmetrical within the scope of flexure.

Another purpose and object of my invention is to provide a means for changing the shape of the coil to vary the inductance value of the coil, said coil being continuous part of an electrical circuit.

Another purpose and object of my invention is to provide a coil of such material which will permit flexure within its elastic limit and to means limiting such motion as to be applied to one or both of its ends.

Another object is to provide a variable shaped inductor coil in which one portion of the coil is uniform and a second portion asymmetrical itself and with respect to the first portion, said coil being a continuous part of an electrical circuit.

Another purpose and object of my invention is to provide the part of a motions indicator (telemetering or teletransmission) effected by changing the shape of an inductor coil by the motion to be indicated.

Another purpose and object of my invention is to provide the part of a vibration explorer (amplitude, phase, and frequency); and a dynamic balance indicator in which an inductor coil is deformed. The coil forming a part of said electrical and mechanical systems.

Another purpose and object of my invention is to provide frequency modulation effected by deformation of an inductor coil in which said coil forms part of an electrical circuit.

Another purpose and object of my invention is to provide a part of a phonograph pick-up, microphone, or limit tripper pick-up mechanisms in which a variable inductor coil is deformed in accordance with such motions or impingements relative to said mechanisms.

Another purpose and object of my invention is to provide a part of warhead detonators, shells, rockets, mines and other explosive devices in which a deformable inductor coil is actuated, said coil forming one or more parts of the electromechanical system.

Another purpose and object of my invention is to provide a sensitive and positive means of controlling or tuning electric circuits in which a variable inductor coil forms one or more parts of the electric circuit.

Another purpose and object of my invention is to provide a variable inductor coil which requires fewer parts in construction and adjustment, and may be self supportable as to nominal shape and may be self deformable or actuated by structural elements of which the coil forms a part thereof.

Another purpose and object of my invention is to provide means to construct mechanisms of small size and/or of light weight affording compactness with respect to electrical or electronic oscillator sections of which a variable inductor coil forms one or more parts of the electric circuit.

Another purpose and object of my invention is to provide a variable inductor coil which is simple in construction.

Another purpose and object of my invention is to provide a variable inductor coil of small physical size permitting the use of small fixed associated electrical and structural parts.

Another purpose and object of my invention is to provide the construction of small sensitive tuning or responding devices in which the actuating means affecting the variable inductance of which the coil forms a part is relatively frictionless and resistanceless, thereby offering low energy absorption and/or low torque.

Another purpose and object of my invention is to provide instantaneous control, pick-up and responding devices in which a variable coil forms a part, in which motions affecting said coil are coupled directly to or made to impinge upon the coil or coil elements in the absence of additional loading and torque stresses in the absence of lead levers, wedges, and/or pivots, diaphragms, etc.

I accomplish these and other objects by the construction herein set forth and shown in the drawings forming a part hereof in which:

Fig. 1 is an elevation and partial section of a phono pick up.

Fig. 2 is a wiring diagram.

Fig. 3 is a detail of a thermostatic actuating means.

Fig. 4 is an elevation and partial section of a modification showing a pressure actuated coil.

Fig. 5 is a fragmentary detail of a modification showing a tubular pressure operated coil.

Fig. 6 is a fragmentary detail of a modification showing a coil having a plurality of materials having different coefficients of expansion.

Similar reference characters refer to similar parts throughout the several views of the drawings and in the specification which forms a part of this, my disclosure.

General description

It is the purpose of this disclosure to point out an embodiment of my invention in detail rather than to attempt to show all possible modifications which may be made to adapt it to the numerous applications, uses, and purposes for which the underlying principles are suited.

My invention relates to an inductor coil of semi-rigid construction of asymmetrical proportions which will permit deformation of portions of the coil or coil elements and respond to mechanical motion, movements or impingements. The physical shape and relative proportions of this inductor coil have a definite relationship to the type and direction of motion to be applied.

The motion or motions or impingements are applied and the shape of the coil shall be such that the inductance value of the coil shall at no time pass through a zero phase in cases wherein the applied motion is required to effect either concurrent inductor changes in an electrical circuit.

The preciseness of the detailed specifications are not to be understood as a limitation to the scope of my invention but rather to make the construction and principles more readily understood by one skilled in the art to which this invention pertains.

Coils and circuits of which the coil forms a part have been tuned in many ways by varying the inductance between a plurality of coils; by varying the capacity of the circuit of which the coil forms a part; by varying the coupling of coils. Variometers, variable condensers, and similar devices are common in use for tuning a circuit in which an electronic tube is used.

In my device, the coil itself is changed in form, size, or the coil elements are changed with respect to the geometric axis of the coil, and the coil is thus "deformed." It is my purpose herein to define this physical change to the coil as deformation and thus to differentiate between the change in the structure of the coil itself rather than by employing variable condensers or other forms of variable tuning devices apart from the coil itself, with and/or to the change of current or coupling which changes the wave length and other electrical alterations to the frequency of the circuit.

Herein the word deform or deformation is intended as descriptive of a physical change in the geometry of the coil itself.

The basic principles involved here are twofold and a third principle is embodied in the combination of the first two:

1. A change from one set of conditions (temperature, amplitude, pressure, etc.) to a second set of conditions (D. C. change).

2. A change in which the change from one set of conditions (maxima) to a second set (minima) is at a regular rate, is repetitious, and may be harmonic, pulsating, or multivibrator (A. C. change).

3. A combination of an A. C. and a D. C. change, amplitude modulation, frequency modulation, phase modulation.

The deformation may be either static or stationary, as for instance, an adjustment by a screw to have a fixed adjustment in deforming the coil until the screw may be again turned to effect another adjustment; bending the coil to a fixed position is another example. The deformation may be dynamic or changeable as by a needle of a phonograph when moved or vibrated by the phonograph record. Other examples are by deforming the coil by continuous changes of a thermostat, pressure diaphragm, a solenoid or by electrosensitive circuits mechanically or magnetically connected to deform the coil.

I particularly refer to the wiring diagram in which the arrow is directly applied to the coil.

The arrow is symbolically shown in electric circuits as meaning that the part so shown is variable; my coil is itself variable; it is deformed to change its electrical characteristics, frequency, logarithmic decrement or reactance; the change applying particularly to extremely accurate measurements of frequency.

In the following specification, I have disclosed a preferred embodiment of the principles underlying my invention and a few modifications generic to the variable coil and operating media to cause its deformation.

Referring to the drawings, I have shown my coil 1 substantially fixed at its one end 2 to an oscillator electronic tube 3 which is fixed in a phono pick up arm 4. The electric connections to the tube and the connections of the pick up arm to the phonograph are commonly known and do not need to be further explained because these connections may vary to suit the particular model or make such as are now in general use, or may be suited to new models.

Disposed between the end 2 and the opposite or sensitive end 5 of the coil is the connection 6 to the cathode 12 of the tube. The sensitive end 5 is connected through the resistance 7 and condenser 8 to the grid 9 of the tube and to the ground 10 through the condenser 11 as is the fixed end of the coil. The plate 13 is connected through the condenser 14 to the negative, and direct to the positive potential of the plate circuit.

The condensers 8, 11 and 14 and the resistance 7 may be positioned within the coil 3 in a phono pick up and held in place by the connection 15 from the sensitive end 5.

The needle 16 is secured or fixed to the end 5 of the coil 1. The diameter of the end 5 is substantially smaller than the end 2 of the coil and the axis 1' of the coil is positioned to diverge from the axis 1'' at the end 2, causing the coil to be asymmetrical both in diameter and with regard to the axial center; the coil not having a straight axis nor uniform diameter.

In the phono applications and similar uses, the action transmitted from the needle to the coil will be directed along an axis not parallel to the geometrical axis of the coil.

The arm 4 may be equipped with an adjusting screw 17 to make D. C. changes in the coil in order to effect a D. C. shift in the oscillator (carrier) frequency; a resilient contact member 18 is provided between the adjusting screw 17 and the end 5 of the coil 1.

My coil may be deformed and the deformation adjusted by screws, levers, wedges, and similar devices with or without a resilient member for many uses and purposes effecting D. C. or A. C. changes as desired.

The deformation may also be changed continuously; deformation, by thermal, pressure, magnetic or other variables applied to move the sensitive end of the coil or coil elements in many mechanical ways, such as thermostats, pressure diaphragm, or bellows, solenoids, etc.

In Fig. 4, I have shown the coil 21 secured at the end 22 to a fixed member 23 and provided with an electrical connection 24. An electronic tube (not shown) is connected to the movable end 25 which is also connected to a pressure bellows 26 by the rod 27 or which may be used to connect a thermostat such as 28 shown in Fig. 3, or any other device to impart movement to the coil 21 to deform it.

A pressure pipe 29 is provided to increase or decrease the length of the bellows by an increase or decrease of pressure. While I have shown the rod 27 as suitable for imparting axial motion to the coil 21 against the spring 30, a deformation perpendicular to or at an angle from the axis may in some case be desirable in somewhat the manner and direction shown by the screw adjustment, Fig. 1. The disposition and tension of the spring 30 may be altered by the adjusting screw 31 which causes the spring to teeter slightly on its securement 32 to the coil housing 33 which is fixed to the fixed member 23.

Referring to Fig. 5 of the drawings, I have shown my coil 34 as of tubular cross section which may have both a pressure pipe connection 35 and an electrical connection 36 at the fixed end 37, which may be secured to the fixed member 38. When pressure is applied to the tubular coil through the pressure pipe connection, the coil is deformed, as for instance, the tube within a steam gauge.

In Fig. 6 I have shown a bimetal coil 39 or a coil of metal combined with a counterpart of other material having a greater or lesser coefficient of expansion or a coil having a plurality of materials affected by different physical agents, which thus causes the coil to deform by such physical changes as, for instance, the coil may be made of a material affected by a change in humidity, gas, etc. The materials of the coil may be free to move without being fixed at the end 40 or the opposite end 41, which is the electrical conducting part of the coil and is connected to the electric connection 42 which may be connected to an electronic tube.

The coil may thus be so constructed that it tunes itself by the use of a plurality of materials which may be made to deform the coil by temperature, pressure, humidity, the presence of a particular gas or chemical, and by many other agents. The ends of the coil may be attached so as to be moved, or one end may be fixed. Any change in shape, size, or axis; any deformation may be used to change the coil electrically.

The means for deforming my coil may be numerous to suit the many uses for which it is adapted. The deformation of the coil as a means of tuning it may require a variable intermittent or permanent deformation, or vibratory deformation. These means are too numerous to describe in detail here, but they may be made without departing from the principles underlying my invention, of which this disclosure is an embodiment.

Having thus described a preferred embodiment of my invention, what I claim as new and desire to secure by Letters Patent is set forth in the following claims.

I claim:

1. A variable inductance coil having a plurality of turns or electric conducting resilient coil elements disposed helically along a common axis and coil elements coextensive with said first named coil elements having an axis divergent from the axis of said first named coil elements and asymmetrical thereto to confine movement imparted to said last named coil elements within the bounds of asymmetry to confine the variance of electrical inductance to a single phase and means for imparting dynamic impingements to one end of said coil within said single phase.

2. A variable inductance coil having a plurality of yielding electro-conducting turns disposed along a common axis, a part of said turns being substantially smaller in diameter than the other part of said turns, and means for bending said axis to provide asymmetry, whereby any movement may be confined within the bounds of asymmetry and a mechanical pick-up for imparting motion within said bounds of asymmetry.

3. A variable inductance coil having a plurality of yielding electro-conducting turns disposed progressively along a common axis, said coil having a part of said turns fixed and another part of said turns movable and self supportable, said self supportable portion being suitable to be varied by dynamic impingements and, resilient means for bending the axis of said coil and means for adjusting said resilient means to adjust the degree of asymmetry.

4. A variable inductance coil for an electric circuit in which said coil comprises a plurality of helical turns disposed to progress along its axis, said coil having one end fixed and the other end movable to deform the coil and means for vibrating the movable end to change the inductance of the coil, a plurality of connections to said coil to cause all or a part of said coil to form a part of a continuous electric circuit, said coil having a part of its turns along said axis and another part asymmetrical in relation to the axis, whereby the movement of vibrations is confined to a single response.

5. A variable inductance coil having coil elements extending along a straight axis and other coil elements extending along an axis out of line with relation to said straight axis and asymmetrical in relation to said coil elements along said straight axis, a part of said coil element being fixed against movement and another part being movable out of line with said straight axis whereby movement imparted to said movable coil elements is responsive to a single phase.

6. An inductance coil for phono pick up having a plurality of coil turns a part of which are resilient and responsive to movements imparted mechanically by a phonograph needle acting to move said resilient part of said coil turns, and another part of said coil turns having one of its coil turns fixed and others disposed along the axis of the coil, said resilent movable coil turns being progressively disposed along an axis at one side of the axis to said fixed coil turn, whereby movement of said movable turns is confined to one side of the axis to said fixed coil turn to limit the response to a single phase.

EUGENE EDWARD OSTROW.

REFERENCES CITED

The following references are of record in the file of this patent:

UNITED STATES PATENTS

| Number | Name | Date |
|---|---|---|
| 357,054 | Watkins | Feb. 1, 1887 |
| 793,777 | Fessenden | July 4, 1905 |
| 1,533,749 | Meirowsky | Apr. 14, 1925 |
| 1,544,754 | Hill | July 7, 1925 |
| 1,961,783 | Roder | June 5, 1934 |
| 2,159,105 | Reid | May 23, 1939 |
| 2,294,881 | Alford | Sept. 8, 1942 |
| 2,367,576 | Harvey | Jan. 16, 1945 |
| 2,371,373 | Badmaieff | Mar. 13, 1945 |
| 2,436,946 | Tatro | Mar. 2, 1948 |

FOREIGN PATENTS

| Number | Country | Date |
|---|---|---|
| 373,973 | Great Britain | June 30, 1932 |
| 542,395 | Great Britain | Jan. 7, 1942 |